(12) United States Patent
DeAngelis et al.

(10) Patent No.: US 7,813,947 B2
(45) Date of Patent: Oct. 12, 2010

(54) SYSTEMS AND METHODS FOR OPTIMIZING BUSINESS PROCESSES, COMPLYING WITH REGULATIONS, AND IDENTIFYING THREAT AND VULNERABILTY RISKS FOR AN ENTERPRISE

(75) Inventors: Stephen F. DeAngelis, Washington Crossing, PA (US); Frederick W. Stangl, Langhorne, PA (US); Doug Todd, HoHoKus, NJ (US)

(73) Assignee: Enterra Solutions, LLC, Yardley, PA (US)

( * ) Notice: Subject to any disclaimer, the term of this patent is extended or adjusted under 35 U.S.C. 154(b) by 1597 days.

(21) Appl. No.: 10/842,992

(22) Filed: May 11, 2004

(65) Prior Publication Data
US 2005/0065807 A1 Mar. 24, 2005

Related U.S. Application Data

(60) Provisional application No. 60/505,282, filed on Sep. 23, 2003.

(51) Int. Cl.
*G06F 17/50* (2006.01)
(52) U.S. Cl. .......................................... 705/7
(58) Field of Classification Search ....................... 705/7
See application file for complete search history.

(56) References Cited

U.S. PATENT DOCUMENTS

| | | | |
|---|---|---|---|
| 6,925,443 B1 | 8/2005 | Baggett, Jr. et al. | |
| 6,980,927 B2* | 12/2005 | Tracy et al. | 702/181 |
| 6,993,448 B2 | 1/2006 | Tracy et al. | |
| 2002/0099578 A1* | 7/2002 | Eicher et al. | 705/7 |
| 2003/0009355 A1* | 1/2003 | Gupta | 705/2 |
| 2003/0084053 A1* | 5/2003 | Govrin et al. | 707/100 |
| 2003/0110249 A1* | 6/2003 | Buus et al. | 709/224 |

(Continued)

*Primary Examiner*—Johnna Loftis
(74) *Attorney, Agent, or Firm*—K&L Gates LLP

(57) ABSTRACT

Methods and systems for optimizing business processes, complying with governmental regulations, and identifying threat and vulnerability risks for an enterprise are disclosed. According to various embodiments, the method includes identifying at least one critical asset of an enterprise and identifying at least one business process of the enterprise associated with the identified critical asset. The method further includes performing at least one of a risk analysis, a regulatory compliance analysis and a business process optimization analysis for the business process based on at least one of an evaluation of a technological component associated with the business process, a threat profile for an area of concern associated with the business process and the critical asset, and/or an interdependency matrix of business processes of the enterprise. In addition, the method may include developing a strategy for the enterprise's performance of the business process based on the performance of the risk analysis, the regulatory compliance analysis and/or the business process optimization analysis for the business process. Also, the method may include monitoring the enterprise's performance of the business process to assess compliance with the strategy.

18 Claims, 12 Drawing Sheets

OTHER PUBLICATIONS

Dickinson et al, Technology portfolio management: Optimizing interdependent projects over multiple time periods. Nov. 2001. dialog file 15: 228906.*

OTHER PUBLICATIONS

Alberts et al, OCTAVE Catalog of Practices, Version 2.0—Oct. 2001—from www.cert.org.*

Alberts and Dorofee, OCTAVE Criteria, Version 2.0—Dec. 2001—from www.cert.org.*

Denker, Stephen; Steward, Donald V.; Browning, Tyson R. Planning concurrency and managing iteration in projects. Sep. 2001. from dialog file 15: 2217841.*

Tho, M.Nguyen; Tjoa, A. Min. Zero-Latency Data Warehousing for Heterogeous Data Sources and Continuous Data Streams. Institute of Software Technology and Interactive Systems, Vienna University of Technology.*

Alberts et al., "An Introduction to the OCTAVE$^{SM}$ Method," www.cert.org/octave/methodintro.html, Jan. 30, 2001.

Lambros et al., "Combine business process management technology and business services to implement complex Web services," IBM Web Services, May 2001.

Starr et al., "Enterprise Resilience: Managing Risk in the Networked Economy," 2003.

Hamerman et al., "Sarbanes-Oxley Compliance: Look Internally for IT Building Blocks," Sep. 25, 2003.

* cited by examiner

SYSTEMS AND METHODS FOR OPTIMIZING BUSINESS PROCESSES, COMPLYING WITH REGULATIONS, AND IDENTIFYING THREAT AND VULNERABILTY RISKS FOR AN ENTERPRISE

PRIORITY CLAIM

This application claims priority under 35 U.S.C. §119 to U.S. provisional patent application Ser. No. 60/505,282, filed Sep. 23, 2003.

CROSS-REFERENCE TO RELATED APPLICATIONS

The present application is related to the following concurrently filed applications:
1. U.S. application Ser. No. 10/842,993, entitled "Method for Optimizing Business Processes, Complying with Regulations, and Identifying Threat and Vulnerability Risks for an Enterprise," by DeAngelis et al; and
2. U.S. application Ser. No. 10/842,991, entitled "Systems for Optimizing Business Processes, Complying with Regulations, and Identifying Threat and Vulnerability Risks for an Enterprise," by DeAngelis et al.

BACKGROUND

Embodiments of the present invention are directed generally to methods for optimizing business processes, complying with governmental regulations, and identifying threat and vulnerability risks for an enterprise.

Businesses today face many external pressures. One set of pressures is economic, such as meeting shareholder demands to leverage existing investments to improve performance, thereby increasing the shareholders' investment. Another set of pressures includes compliance with governmental regulations. Over the last several years, a tremendous amount of new laws and regulations have been promulgated, which have created costly and complex compliance requirements for businesses. These new compliance requirements include the U.S. Patriot Act, the Sarbanes-Oxley Act, the Health Insurance Portability and Accountability Act (HIPAA), privacy laws and regulations, and others. Another set of pressures concerns security. Businesses today face both internal and external security concerns, ranging from employee theft of company trade secrets, to denial of service attacks on company web sites, to catastrophic terrorist attacks. A business's ability to address these technological concerns is often exacerbated by the fact that many businesses today use disparate, unconnected information systems.

One known technique for assessing the information security risks of an organization is the OCTAVE® (Operationally Critical Threat, Asset, and Vulnerability Evaluation[SM]) risk-based strategic assessment and planning technique for security. OCTAVE defines the essential components of a comprehensive, systematic, context-driven information security risk evaluation. By following the OCTAVE risk assessment technique, an organization can make information-protection decisions based on risks to the confidentiality, integrity, and availability of critical information technology assets.

SUMMARY

In one general aspect, various embodiments of the present invention are directed to a method for optimizing business processes, complying with governmental regulations, and identifying threat and vulnerability risks for an enterprise. According to various embodiments, the method comprises identifying at least one critical asset of an enterprise and identifying at least one business process of the enterprise associated with the identified critical asset. In addition, the method may include performing at least one of a risk analysis, a regulatory compliance analysis and a business process optimization analysis for the business process based on at least one of an evaluation of a technological component associated with the business process, a threat profile for an area of concern related to the business process and the identified critical asset, and/or an interdependency matrix for business processes of the enterprise. Additionally, the method may include developing a strategy for the enterprise's performance of the business process based on the performance of the risk analysis, the regulatory compliance analysis and/or the business process optimization analysis for the business process. Further, the method may include monitoring the enterprise's performance of the business process to assess compliance with the strategy.

According to various implementations, the method may further comprise executing a mitigation response plan when the enterprise's performance of the business process is not in compliance with the strategy. Also, the development of the strategy may be based on a protection strategy, a regulatory compliance strategy, and a business process optimization strategy for the enterprise. The method may further comprise creating the threat based on an evaluation of at least one technological component of the enterprise associated with the enterprise's performance of the business process.

Further, the step of monitoring the enterprise's performance of the business process may include retrieving data from a plurality of data sources via a zero-latent data model. The data sources may include both structured and unstructured data sources. Also, the monitoring process may use Business Process Management (BPM) technology. In addition, the method may include performing link and/or predictive analysis to identify a security threat for the enterprise.

In another general respect, various embodiments of the present invention are directed to a system comprising at least one process management engine and a data structure. The process management engine may execute and monitor a business process of the enterprise in accordance with a strategy for the enterprise. The strategy may be determined based on the performance of at least one of a risk analysis, a regulatory compliance analysis and a business process optimization analysis for the business process based on an evaluation of a technological profile for the business process and a threat profile for the at least one business process. The data structure may retrieve data from a plurality of data sources as needed by the process management engine.

According to various implementations, the system may further comprise at least one intelligence analytics engine in communication with the data structure and the process management engine. The intelligence analytics engine may be for determining a metric relevant to the business processes of an enterprise based on data in the data sources. The system may also comprise a collaboration technology engine and/or a security and counter-terrorism services engine. The security and counter-terrorism services engine may be for performing link and predictive analysis on the data in the plurality of data sources to identify security and terroristic threats. The data structure may be manifested as, for example, a zero-latent universal data model.

DESCRIPTION OF THE FIGURES

Embodiments of the present invention are described herein by example in conjunction with the following figures, wherein.

DESCRIPTION

FIGS. 1-10 illustrate methods of optimizing business processes, documenting compliance with regulations, and identifying threat and vulnerability risks for an enterprise according to various embodiments of the present invention. The enterprise may be, for example, a business or a government agency.

Figure 1:
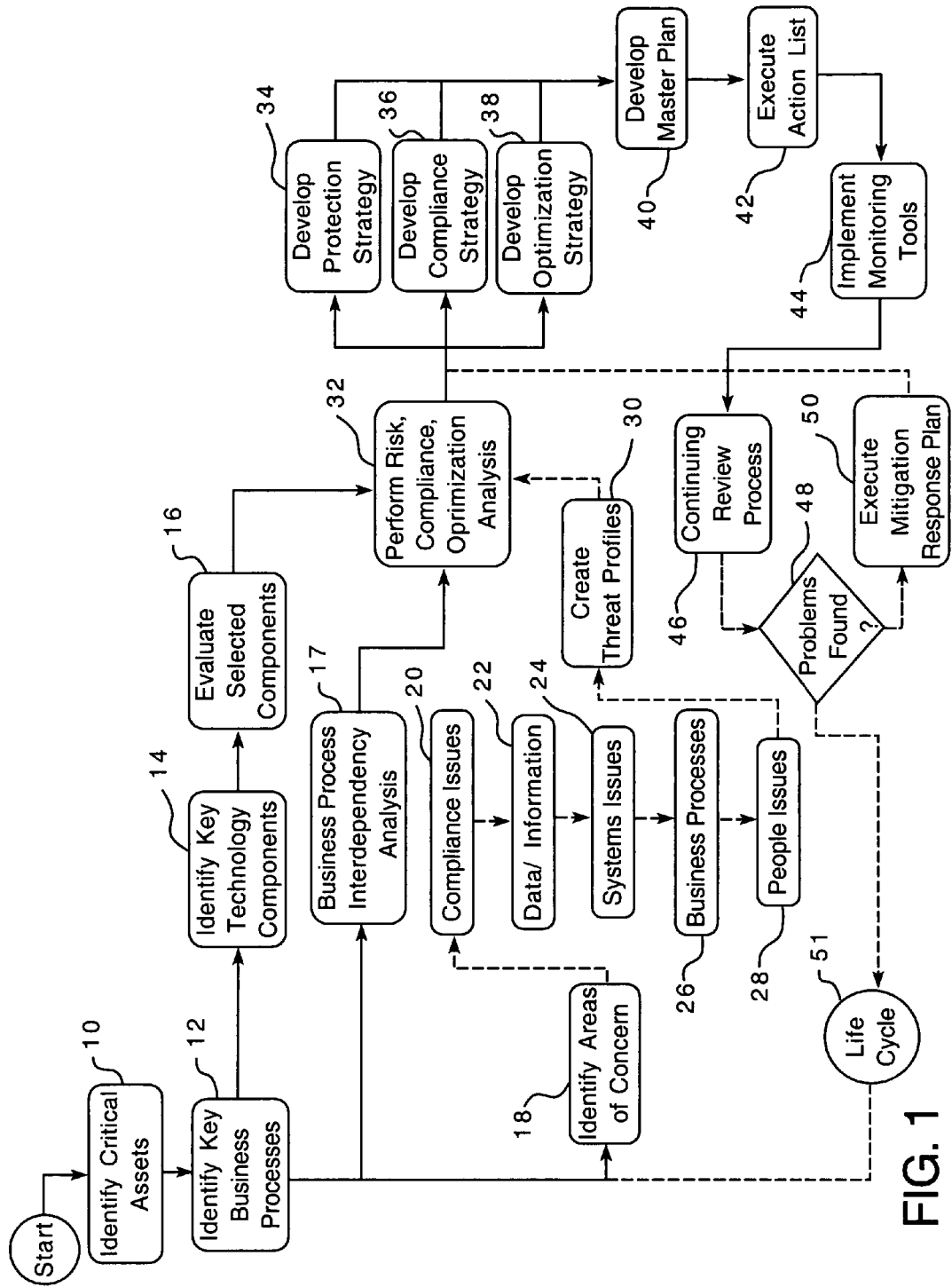
FIGS. 1-10 are flowcharts illustrating various aspects of methods for optimizing business processes, complying with governmental regulations, and identifying threat and vulnerability risks for an enterprise according to various embodiments of the present invention.

With reference to FIG. 1, the process starts at block 10, with the identification of critical assets of the enterprise. This may be performed by a review of the enterprise's functions and assets, including interviews with its employees and principles. For example, if the enterprise is a bank, a critical asset may be a customer. According to various embodiments, the technique used by OCTAVE to identity critical assets of the enterprise may be employed. After the critical assets have been identified, the process advances to block 12, where key business processes of the enterprise associated with the identified critical assets are identified. For the banking example, a key business process related to the critical asset (i.e., customers) may be the intake of new customers.

Having identified the key business processes at block 12, the method, according to various embodiments, includes a technological assessment branch, a business process interdependency analysis branch, and a business assessment branch. On the technological assessment branch, the process advances to block 14, where key technological components related to the key business process identified at block 12 are identified. More details regarding the process for identifying key technological components are provided below in connection with FIG. 4. From block 14, the process advances to block 16, where selected key technological components identified at block 14 are evaluated. More details regarding the process for evaluating selected components are described below in connection with FIG. 5.

On the business process interdependency analysis branch, the process advances to block 17, where an interdependency matrix of the various business processes identified at block 12 is created. The purpose of this analysis is to detect vulnerabilities in process flow by identifying non-compliant, unsecured, suboptimal and/or conflicted links between the business processes of the enterprise by showing, for example, where processes of the enterprise intersect. More details about the process for generating the interdependency matrix are provided below in conjunction with FIG. 5A.

On the business assessment branch, the process advances from block 12 to block 18, where areas of concern related to the business process identified at block 12 are identified. These areas may include, for example, compliance issues (block 20), data/information issues (block 22), systems issues (block 24), business processes (block 26), and people issues (block 28). Continuing with the banking example, therefore, the compliance issues may include meeting regulatory compliance requirements with respect to the intake of new customer, such as Office of Foreign Assets Control (OFAC) regulations, privacy regulations, U.S. Patriot Act requirements, the Bank Secrecy Act, other banking regulations, etc. Additional details regarding the identification of areas of concern for the identified key business processes are described below in connection with FIG. 2.

Based on the identified areas of concern, the threat profiles for the enterprise related to the business process are created at block 30. Additional details regarding the process for creating the threat profiles are described below in connection with FIG. 3.

On the basis of, for example, the threat profiles on the business assessment branch, the business process interdependency analysis, and the evaluation of the selected components in the technological assessment branch, risk, compliance, and optimization analyses may be performed at block 32. Additional details regarding these analyses are provided below in connection with FIG. 6. It should be noted, however, that the risk, compliance and optimization analyses of block 32 may be performed with only one or any combination of the threat profiles on the business assessment branch, the business process interdependency analysis, and the evaluation of the selected components in the technological assessment branch. The output of these analyses may be used in the development of a protection/security strategy at block 34, the development of a compliance strategy at block 36, and the development of an optimization strategy at block 38. Details regarding the development of these strategies are provided below in connection with FIGS. 7-9.

Based on the protection/security strategy (block 34), the compliance strategy (block 36) and the optimization strategy (block 38), a master plan related to the business process may be developed at block 40. Included in the master plan may be an action list, which may be executed at block 42. At block 44, monitoring tools to monitor execution of the items on the action list are implemented. This may include the implementation of monitoring processes and tools to monitor compliance with the protection/security strategy, the compliance strategy, and the optimization strategy. Additional details regarding the monitoring process are described in below in connection with FIGS. 10 and 11. The results of the monitoring process may be output to end-users associated with the enterprise at portals and dashboards, etc., so that the enterprise may take prompt remedial action. The monitoring of these strategies developed as part of the master plan may be an ongoing process, at block 46, and, if problems are found at block 48 as part of the ongoing review, a mitigation response plan may be executed at block 50. Further, because new protection/security, compliance and optimization concerns may arise over time for the enterprise, the process described above may undergo, as signified by block 51, a continual "life cycle" strategic monitoring of the business process so as to permit the development, for example, of a revised master plan in view of new threats, compliance issues and optimization opportunities.

Figure 2:
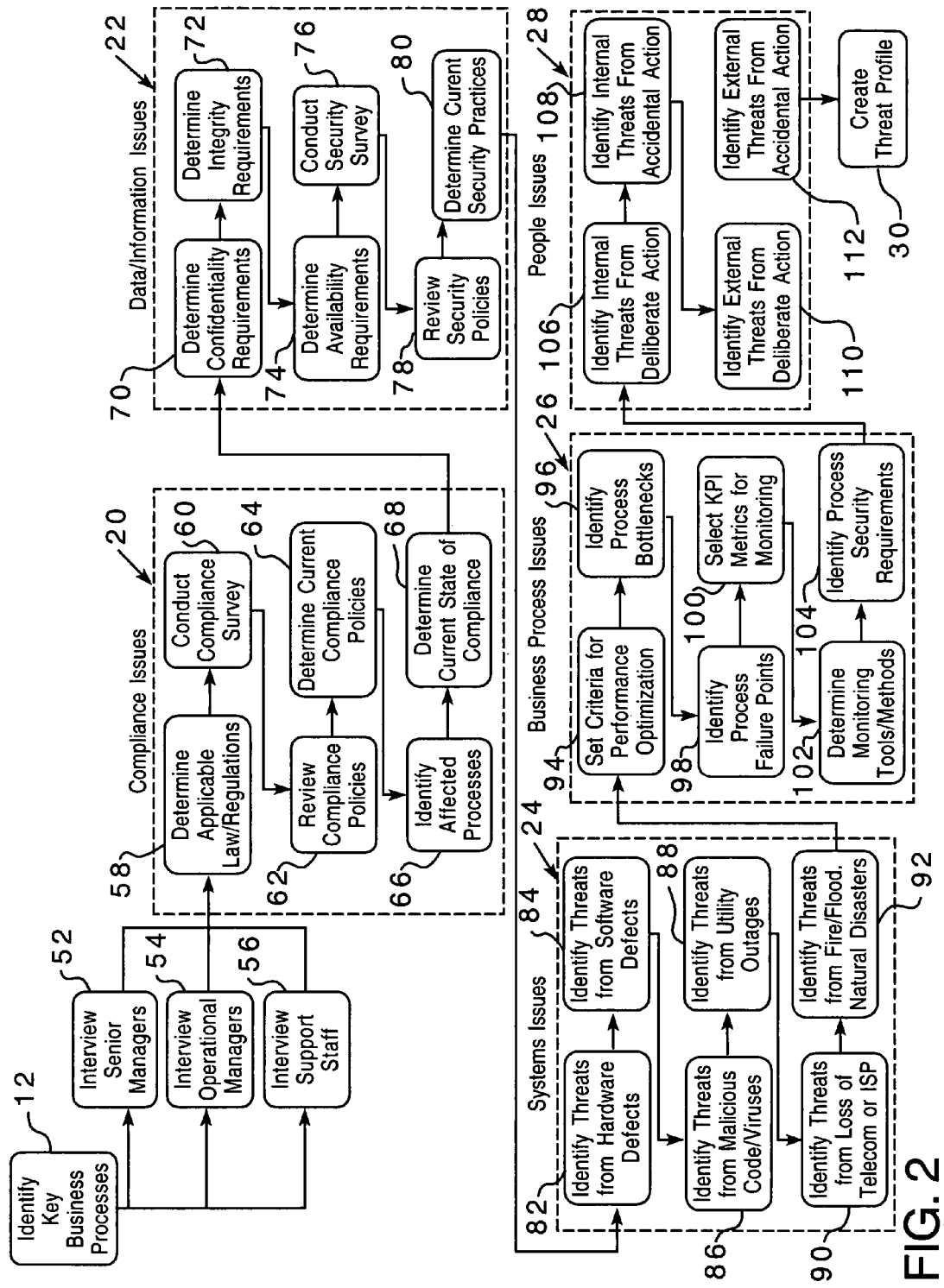

FIG. 2 illustrates a process for identifying areas of concern (block 18 of FIG. 1) for an identified key business process of the enterprise according to various embodiments. The process may include, as illustrated in FIG. 2, interviewing senior managers, at block 52, interviewing operational managers, at block 54, and interviewing support staff, at block 46, to learn about possible areas of concern. Next the process may under-take an evaluation of relevant compliance issues related to the business process. This may include, for example, identifying compliance issues (block 20), identifying data/information issues (block 22), identifying systems issues (block 24), identifying business process issues (block 26), and identifying people issues (block 28).

With respect to compliance issues, the process may include determining applicable laws and regulations at block 56, conducting a compliance survey with respect to those laws and regulations at block 60, reviewing compliance policies of the enterprise at block 62, determining current compliance practices at block 64, identifying affected processes at block 66 and determining the current state of a compliance at block 68.

Evaluation of the data/information issues related to the business process may include, for example, determining confidentiality requirements at block 70, determining integrity requirements at block 72, determining availability requirements at block 74, conducting a security survey for the enterprise at block 76, reviewing security policies of the enterprise at block 78, and determining current security practices for the enterprise at block 80.

Evaluation of the systems issues may include, for example, identifying threats from the hardware defects at block 82, identifying threats from software defects at block 84, identifying threats from malicious code and viruses at block 86, identifying threats from utility outages at block 88, identifying threats from loss of network connectivity, such as outages from telecommunications providers or ISPs, at block 90, and identifying threats from fire, flood and other natural disasters at block 92.

Evaluation of the business process issues may include, for example, setting criteria for performance optimization at block 94, identifying process bottlenecks at block 96, identifying process failure points at block 98, selecting key performance indicator ("KPI") metrics for monitoring at block 100, determining monitoring tools and methods at block 102, and identifying process security requirements at block 104.

Also, evaluation of the people issues may include identifying, at block 106, internal threats from deliberate action, identifying internal threats from accidental action at block 108, identifying external threats from deliberate action at block 110, and identifying external threats from accidental action at block 112.

Based on each of these analyses, e.g., the analyses of compliance issues, data/information issues, systems issues, business process issues and people issues, threat profiles for the business process may be created at block 30.

Figure 3:
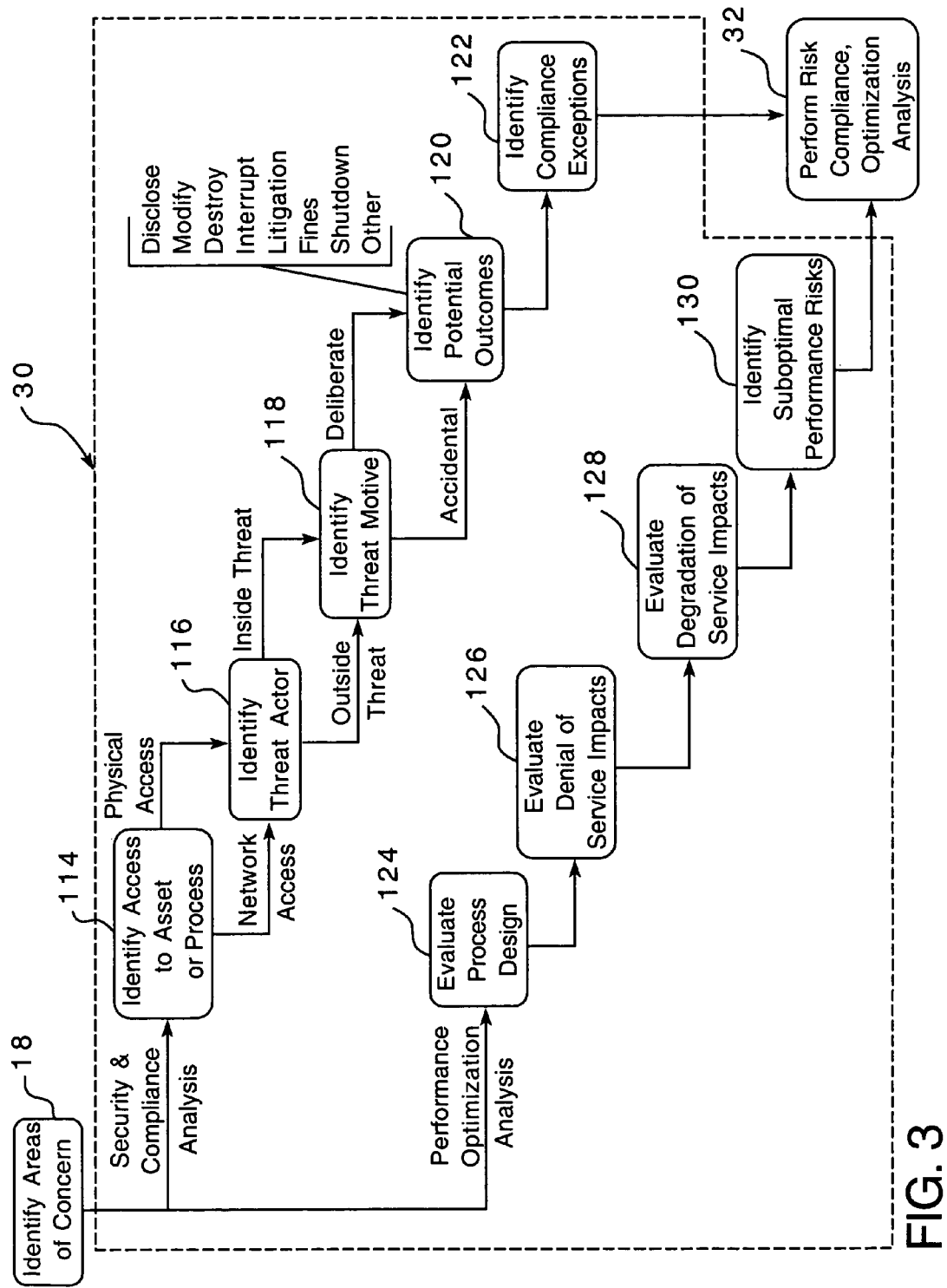

FIG. 3 illustrates a process for creating the threat profiles according to various embodiments in the present invention. First, as explained previously, areas of concern are identified at block 18 (see FIG. 1). Having identified the areas of concern, the process may undergo both a security/compliance analysis and a performance optimization analysis. With regard to the security/compliance analysis, the process advances to block 114 where access to the asset or process of the enterprise is identified. For both physical and network access, the threat actors are identified at block 116. After identifying the threat actors, for both inside and outside threats, the threat motives are identified at block 118. Having identified the threat motives, for both deliberate and accidental motives, the potential outcomes from the threats are identified at block 120. The potential outcomes include, for example, unwanted disclosure of information of the enterprise, modification of internal information of the enterprise, destruction of internal information of the enterprise, interruption of the workflow of the enterprise, litigation, fines, and/or shutdown of aspects the enterprise's business process. From block 120, the process advances to block 122 where compliance exceptions are identified.

With regard to the performance optimization analysis, the method may include evaluating process design at block 124. Next at block 126, an evaluation of denial of service impacts may be undertaken. At block 128, degradation of service impacts may be evaluated. At block 130, sub-optimal performance risks may be identified. The results from the security/compliance analysis and the performance optimization analysis are used in the performance of the risk, compliance, and optimization analysis (see block 32, FIG. 1).

Figure 4:
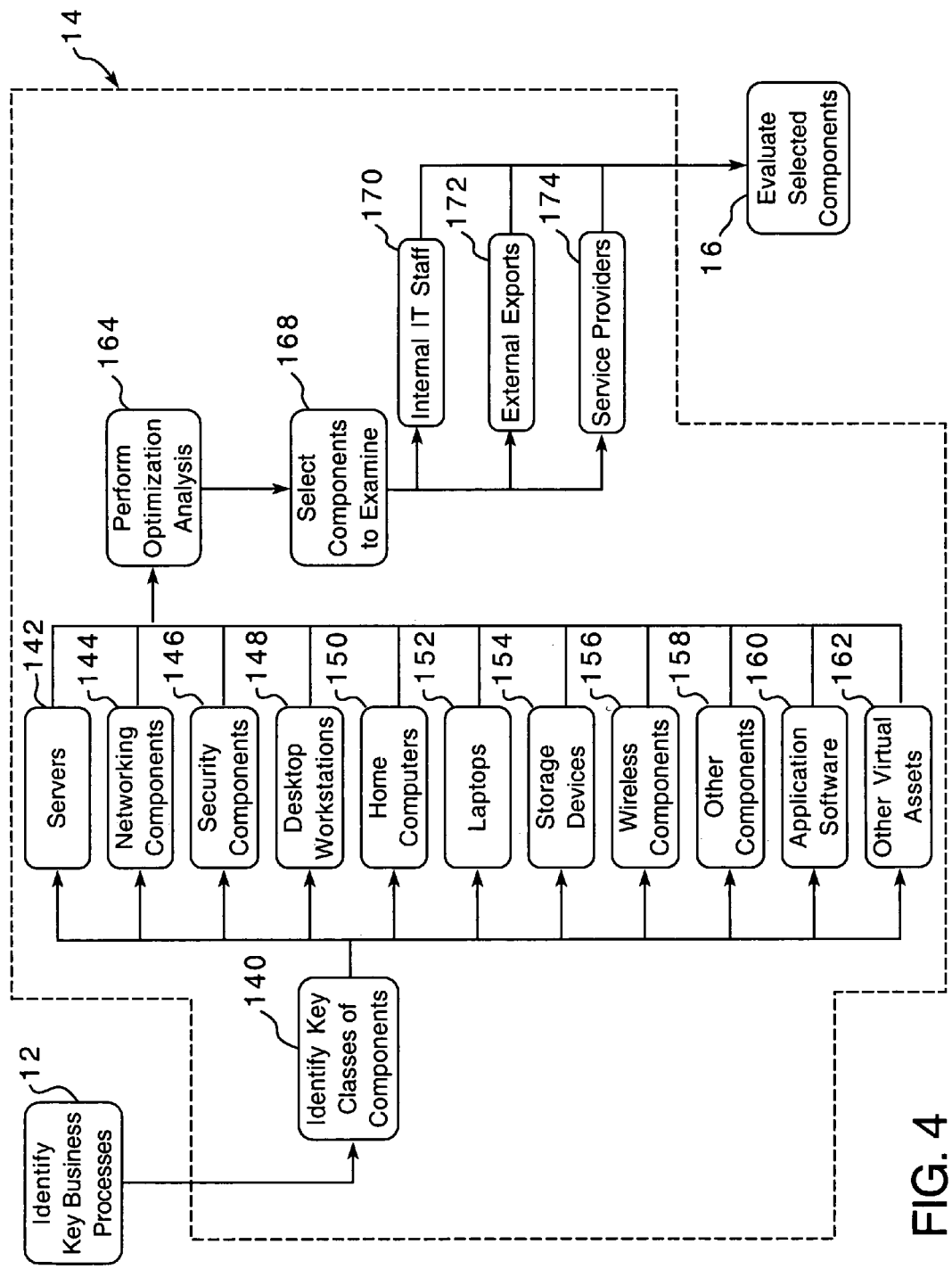

FIG. 4 is a diagram of a method for identifying key technological components (see block 14, FIG. 1) of the business process according to various embodiments of the present invention. The process may include, at block 140, identifying key classes of components. Such classes of components may include, for example, servers 142, networking components 144, security components 146, desktop workstations 148, home computers 150, laptop computers 152, storage devices 154, wireless components 156, other components 158, application software 160, and other virtual assets 162. At block 164, an optimization analysis of how each of the technological classes of components is operating in the system is performed. Based on that analysis, certain components are selected for evaluation at block 168. The components selected for evaluation may be those that are performing sub-optimally in view of the optimization analysis at block 164. Depending on the nature of the selected components, they may be managed, for example, by internal IT staff 170, external experts 172, and/or service providers 174. The selected components are then evaluated at block 16.

Figure 5:
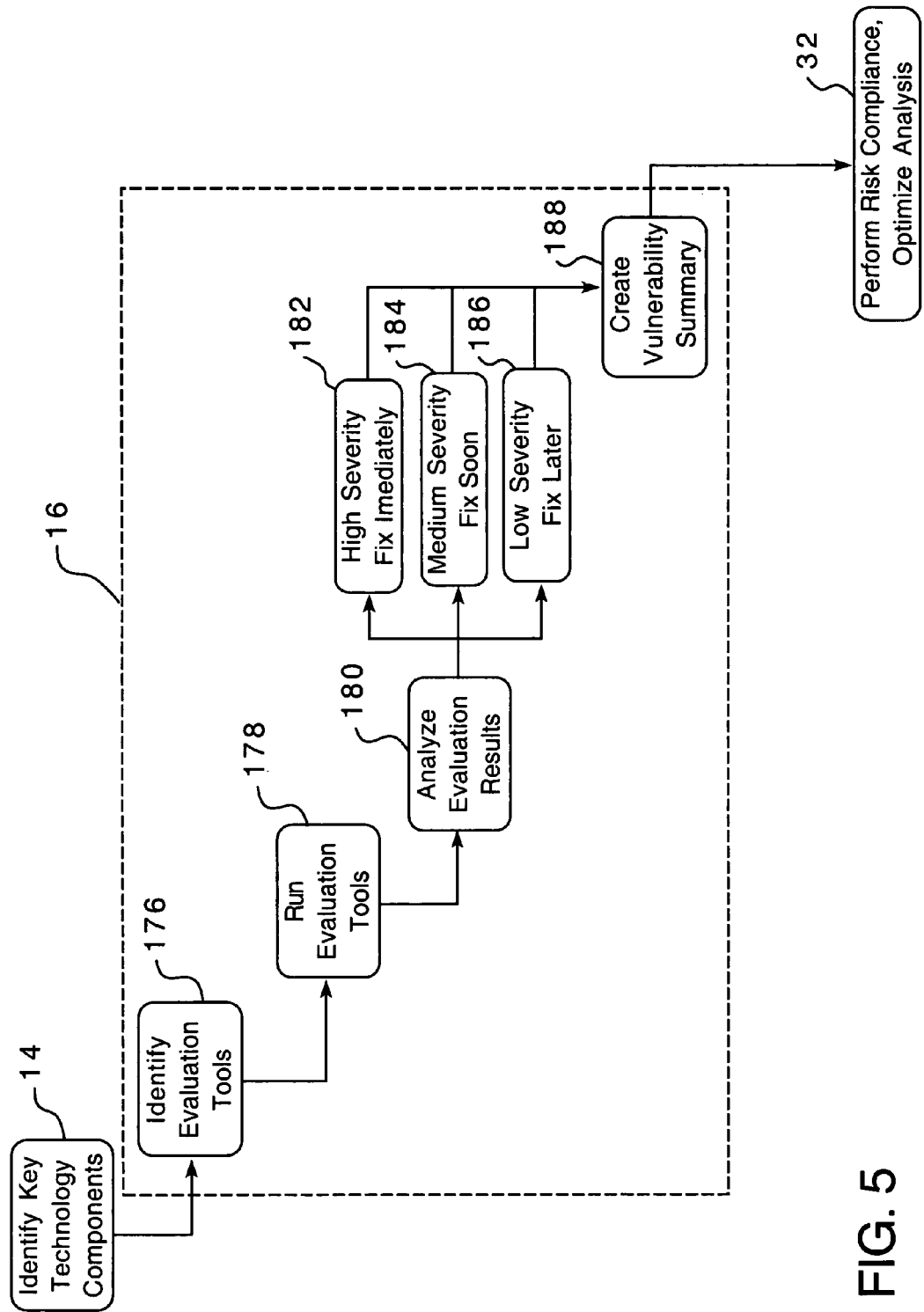

FIG. 5 is a diagram of the process to evaluate selected components 16 (see FIG. 1). The process may initiate at block 176 where evaluation tools relevant to the key technological components are identified. At block 178, the evaluation tools may be run, and at block 180, the evaluation results may be analyzed. The results may be grouped, for example, into three categories: high severity/fix immediately 182; medium severity/fix soon 184; and low severity/fix later 186. Based on the categorization of the evaluation results, a vulnerability summary may be created at block 188. The vulnerability summary may be used in the risk, compliance, and optimization analyses at block 32 (see FIG. 1).

Figure 5A:
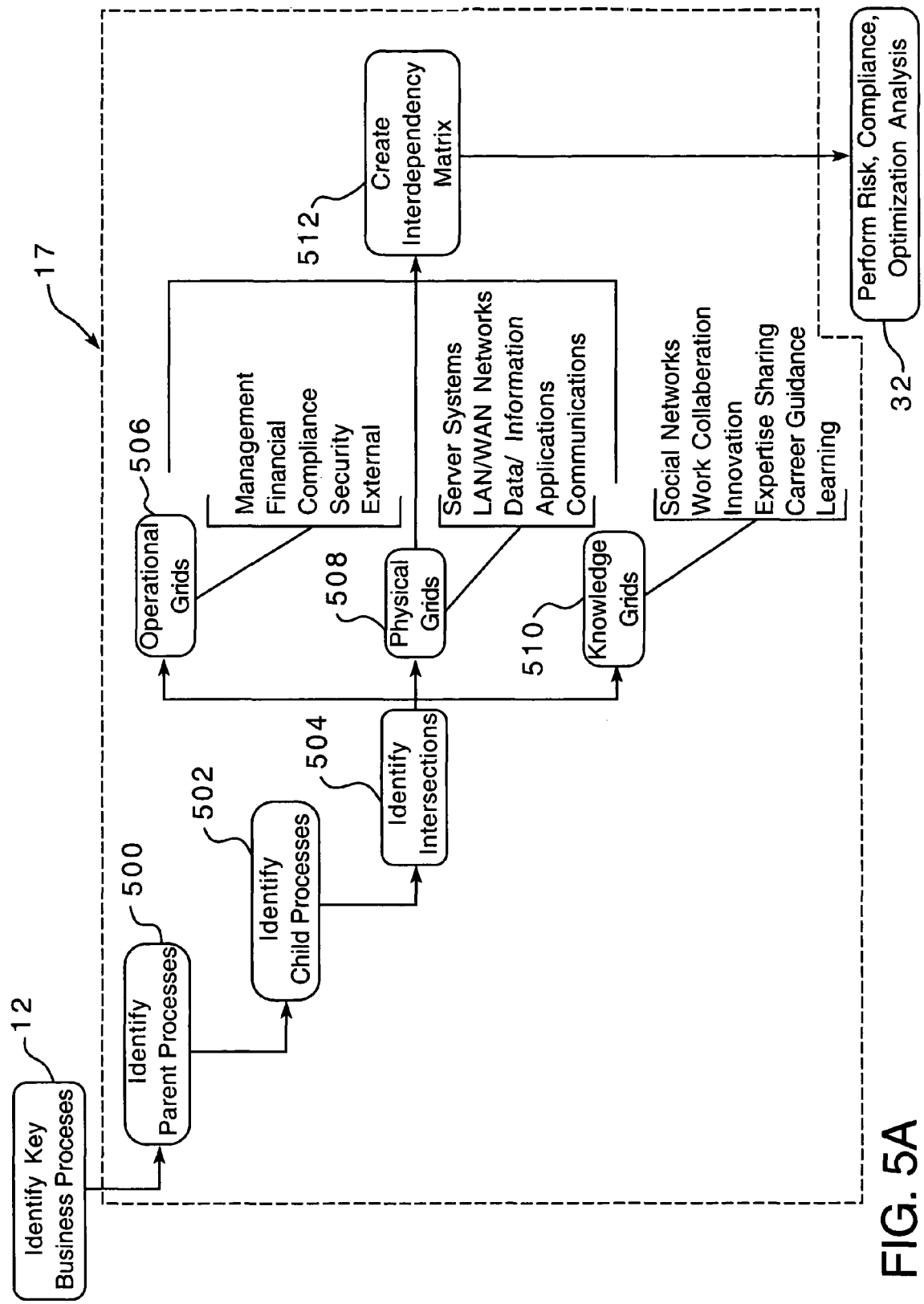

FIG. 5A is a diagram of the process for generating the interdependency matrix 17 according to various embodiments. The process includes, at block 500, based on the key business processes identified at block 12, identifying parent processes of the enterprise. Parent processes may be processes that the subject process depends upon. Next, at block 52, child (or subordinate) processes, e.g., processes that depend upon the subject process, are identified. Next, at block 504, intersections between the various parent, child and subject processes may be identified. Having identified the intersection points, the types of interaction between the processes are evaluated and/or enumerated with respect to different factors. For example, at block 506, the types of interaction with respect to operational grids may be evaluated and/or enumerated. Operational grid factors include, for example, management, financial, compliance, security, external, etc. At block 508, the types of interaction with respect to physical grids may be evaluated and/or enumerated. Physical grid factors include, for example, server systems, LAN/WAN networks, data/information, applications, communications, etc. At block 510, the types of interaction with respect to knowledge grids may be evaluated and/or enumerated. At block 512, the results from the analyses at blocks 506, 508 and 510 may be compiled into an interdependency matrix. The interdependency matrix may be used in the performance of the risk, compliance and optimization analyses 32.

Figure 6:
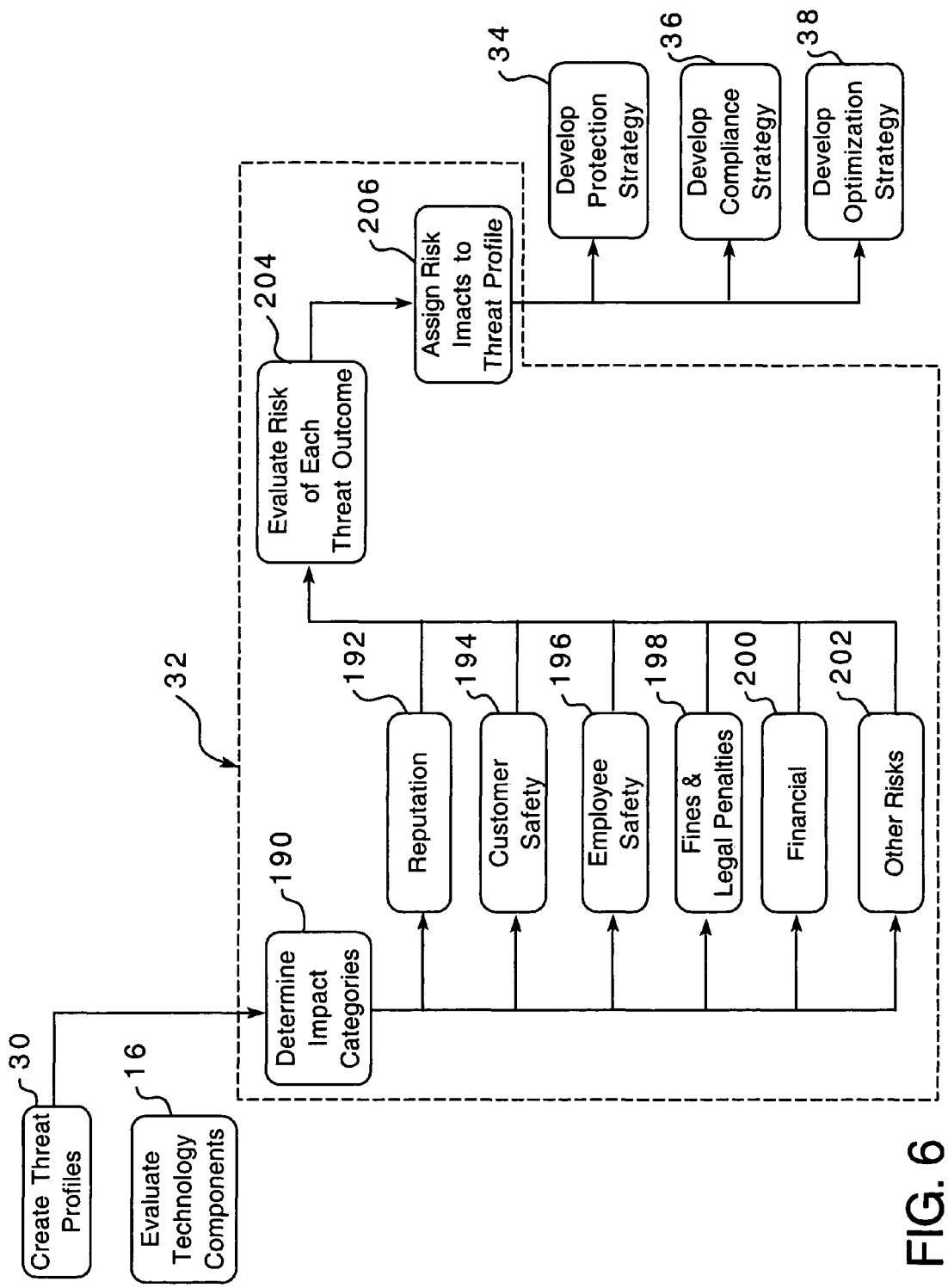

FIG. 6 is a diagram of the process for performing the risk, compliance, and optimization analyses 32 (see FIG. 1). The process may start at block 190, where impact categories may be determined based on the threat profiles determined at block 30 (see FIG. 1), the evaluation of technological components at block 16 (see FIG. 1), and the business process interdependency matrix 512 (see FIG. 5A). The impact categories may include, for example, reputation 192, customer safety 194, employee safety 196, fines and legal penalties 198, financial 200, and other risks 202. At block 204, the risk of the threat on each of these categories may be evaluated, and at block 206, the risk impacts may be assigned to the threat profile. The risk impacts may indicate the level of severity (such as high, medium or low) and the relative priority (fix soon, etc.). The risk impacts may be used in the development of the protection/security strategy 34, the compliance strategy 36, and the optimization strategy 38 (see FIG. 1).

Figure 7:
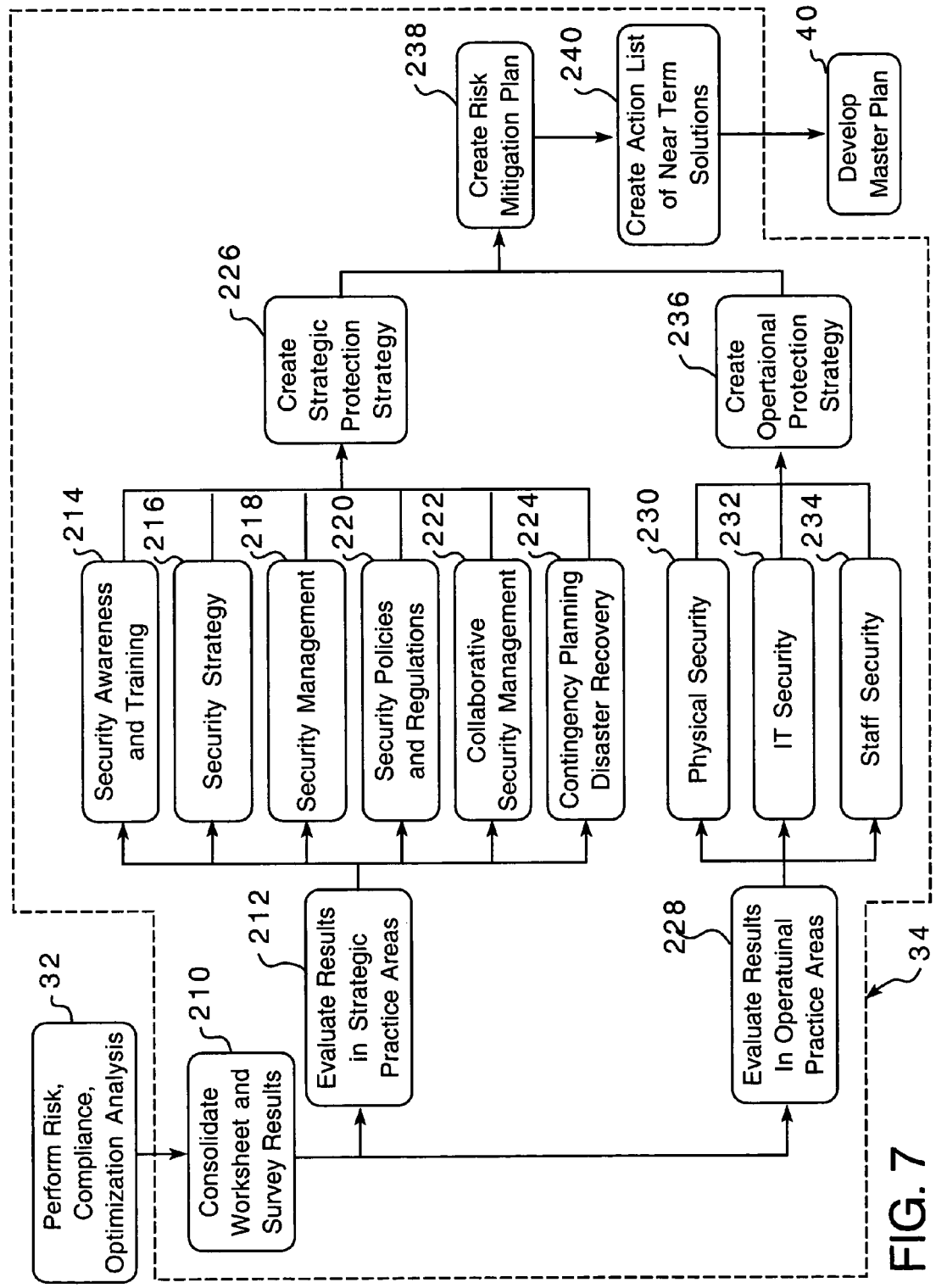

FIG. 7 is a diagram of the process for developing the protection/security strategy 34 (see FIG. 1) according to various embodiments. The process may include, at block 210, consolidating results (such as work sheet and survey results) from the risk, compliance, and optimization analysis 32. From there, the process may advance to block 212, where the results in strategic practice areas may be evaluated. Those strategic practice areas include, for example, security awareness and training 214, security strategy 216, security management 218, security policies and regulations 220, cooperative security management 222, and/or contingency planning, disaster recovery 224. Based on the evaluation results on these strategic practice areas, a strategic protection strategy may be created at block 226.

In addition, the process may include evaluating results in operational practice areas, at block 228. The operational practice areas may include, for example, physical security 230, IT security 232, and staff security 234. Based on results from the evaluation of the operational practice areas, and operational protection strategy may be created at block 236.

At block 238, a risk mitigation plan may then be created based on the strategic protection strategy created at block 226 and the operational protection strategy created at block 236. Based on the risk mitigation plan, an action list of near-term solutions may be created at block 240. From the action list of near-term solutions, the master plan may be developed (see block 40, FIG. 1).

Figure 8:
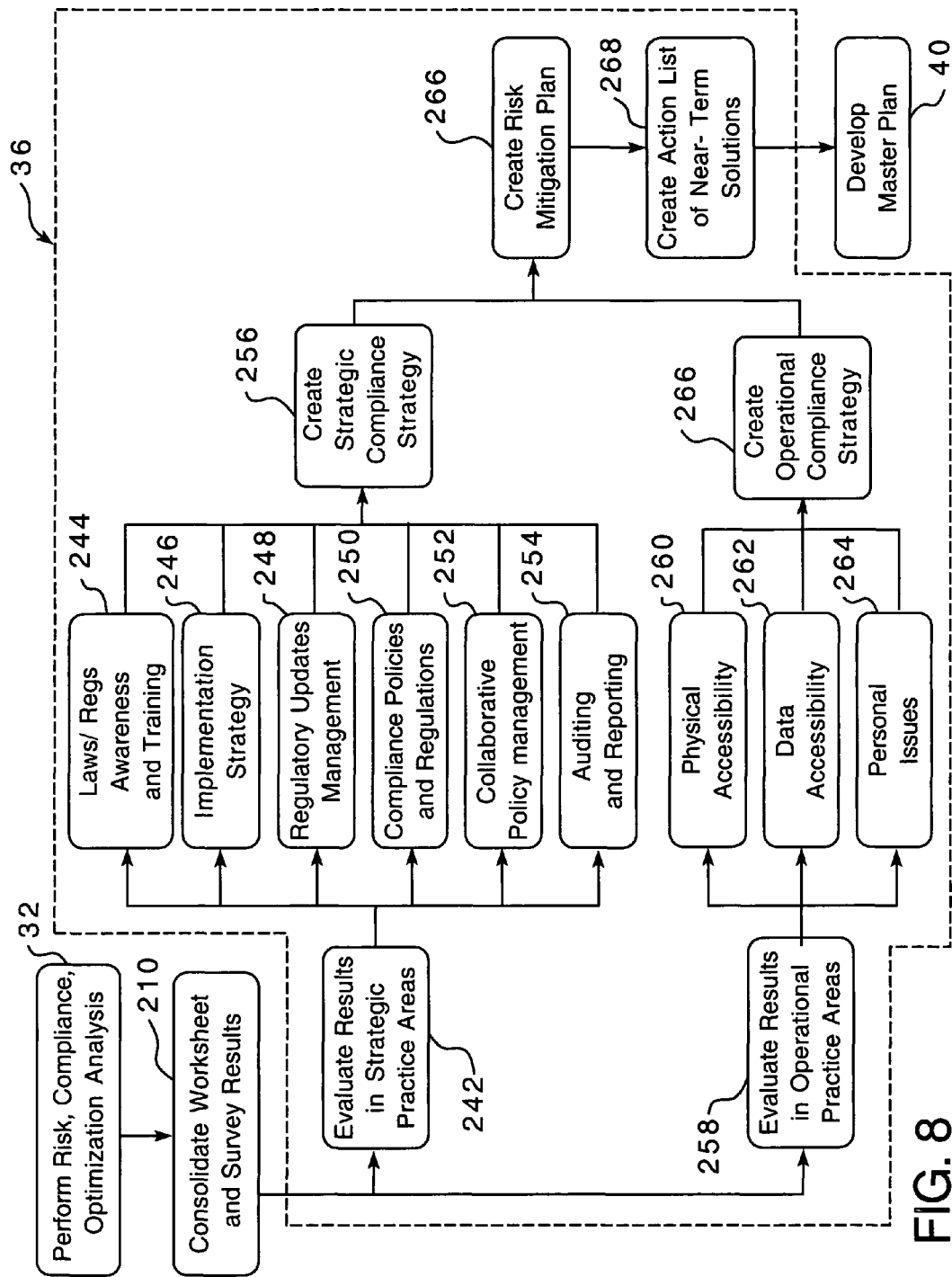

FIG. 8 is a diagram of the process for developing the compliance strategy 36 (see FIG. 1) according to various embodiments. The process may include, at block 242, an evaluation of the results from the compliance analysis 32 in strategic practice areas related to compliance issues. The strategic practice areas may include, for example, laws/regulation awareness and training 244, implementation strategy 246, regulatory updates management 248, compliance polices and regulations 250, collaborative policy management 252 and auditing and reporting 254. Based on the results in these strategic practice areas, a strategic compliance strategy may be created at block 256.

In addition, the method may include evaluating the results from the compliance analysis 32 in operational practice areas at block 258. The operational practice areas may include, for example, physical accessibility 260, data accessibility 262 and personnel issues 264. Based on the results in these operational practice areas, an operational compliance strategy may be created at block 266.

At block 267, a risk mitigation plan for compliance issues may be created based on the strategic compliance strategy at block 256 and the operational compliance strategy at block 266. Based on the risk mitigation plan, an action list of near-term solutions may be created at block 268. This information may be used in the development of the master plan 40 (see FIG. 1).

Figure 9:
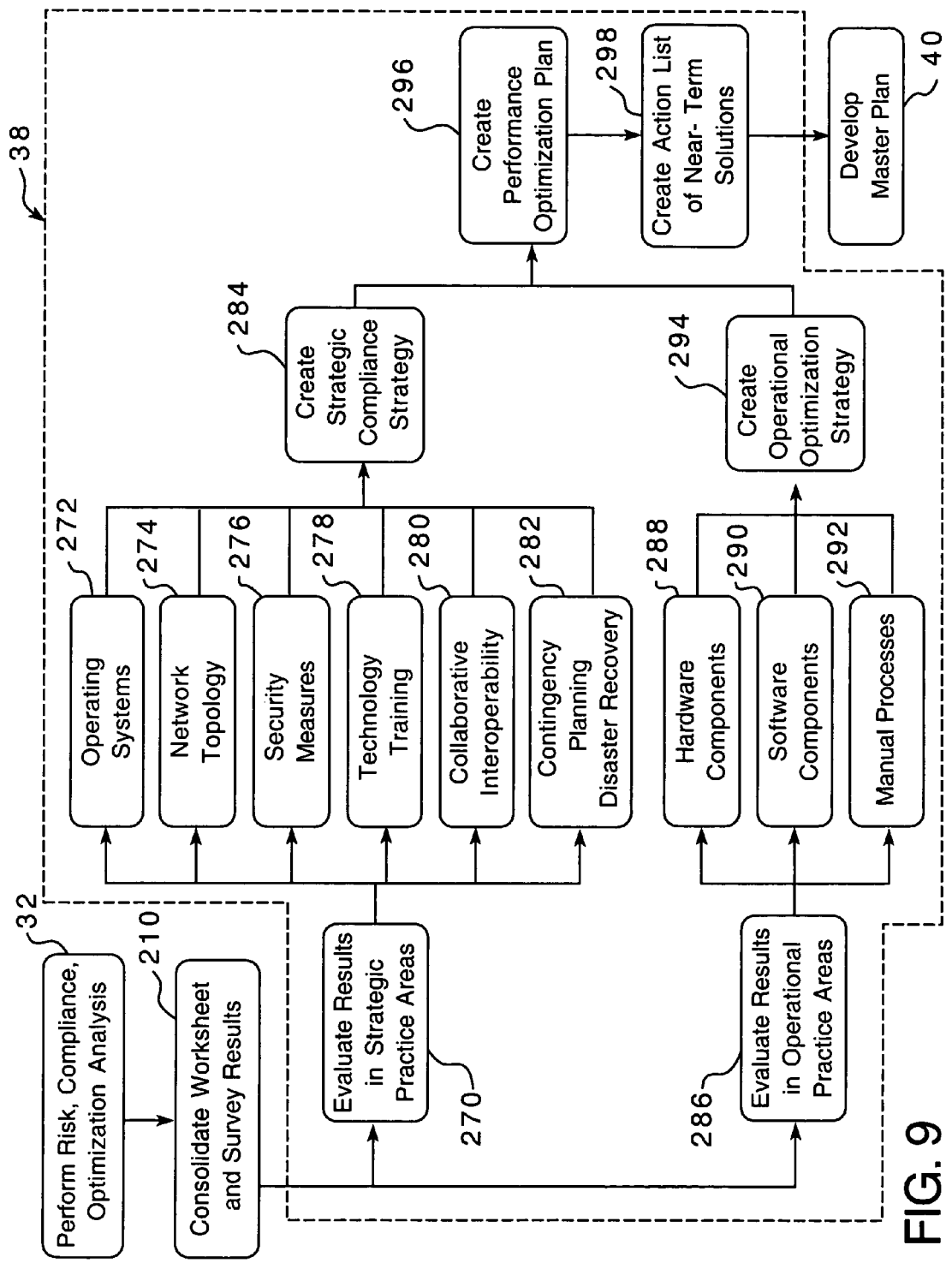

FIG. 9 is a diagram of the process for developing the optimization strategy 38 (see FIG. 1) including the various embodiments. The purpose of this process may be, for example, to make the enterprise's business processes more efficient. The process may include, at block 270, evaluating the results from the optimization analysis with respect to strategic practice areas concerning business process optimization. The strategic practice areas may include, for example, operating systems 272, network topology 274, security measures 276, technology training 278, collaborative and operability 280, and contingency planning and disaster recovery 282. Based on the evaluation of results in these strategic practice areas, a strategic optimization strategy may be created at block 284.

In addition, the method may include evaluating the results from the optimization analysis 32 in operational practice areas related to business process optimization. The operational practice areas may include, for example, hardware components 288, software components 290, and manual processes 292. Based on the evaluation results in these operational practice areas, an operational optimization strategy may be created at block 294.

The method may further include, at block 296, the creation of a performance optimization plan based on the strategic optimization strategy at block 284 and the operational optimization strategy at block 294. From the performance optimization plan, an action list of near-term solutions may be created at block 298. This information may be used in the development of the master plan at block 40 (see FIG. 1).

Figure 10:
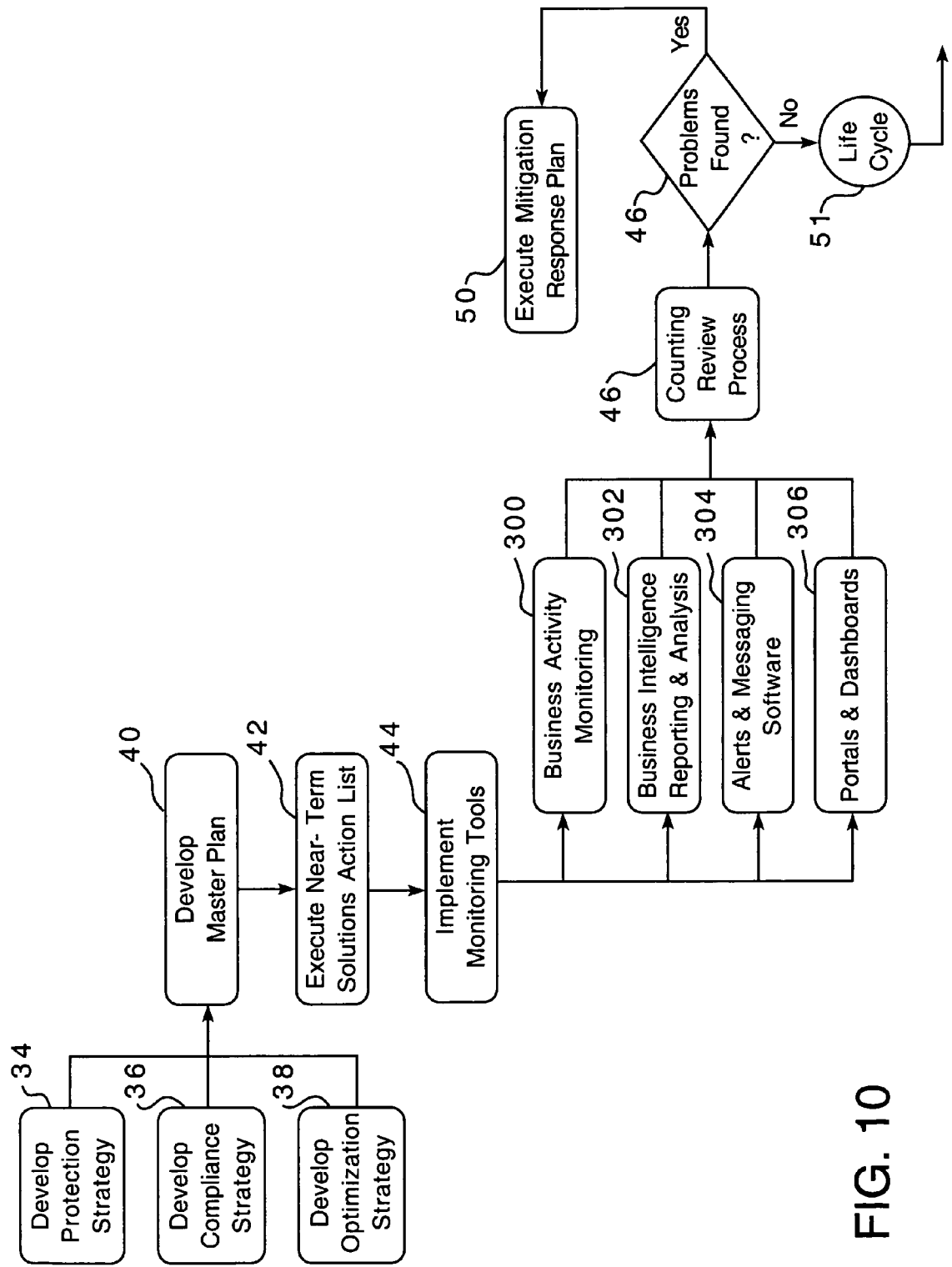

FIG. 10 illustrates additional detail regarding the process of implementing monitoring tools to aid in the execution of the action list for the master plan. As illustrated in FIG. 10, monitoring tools may include, for example, business activity monitoring 300, business intelligence reporting analysis 302, portals and dashboards 304, and alert and messaging software 306. In this way, important information about the enterprise's business processes, be they compliance issues, optimization issues, or security issues, may be communicated to persons who can use the information.

Figure 11:
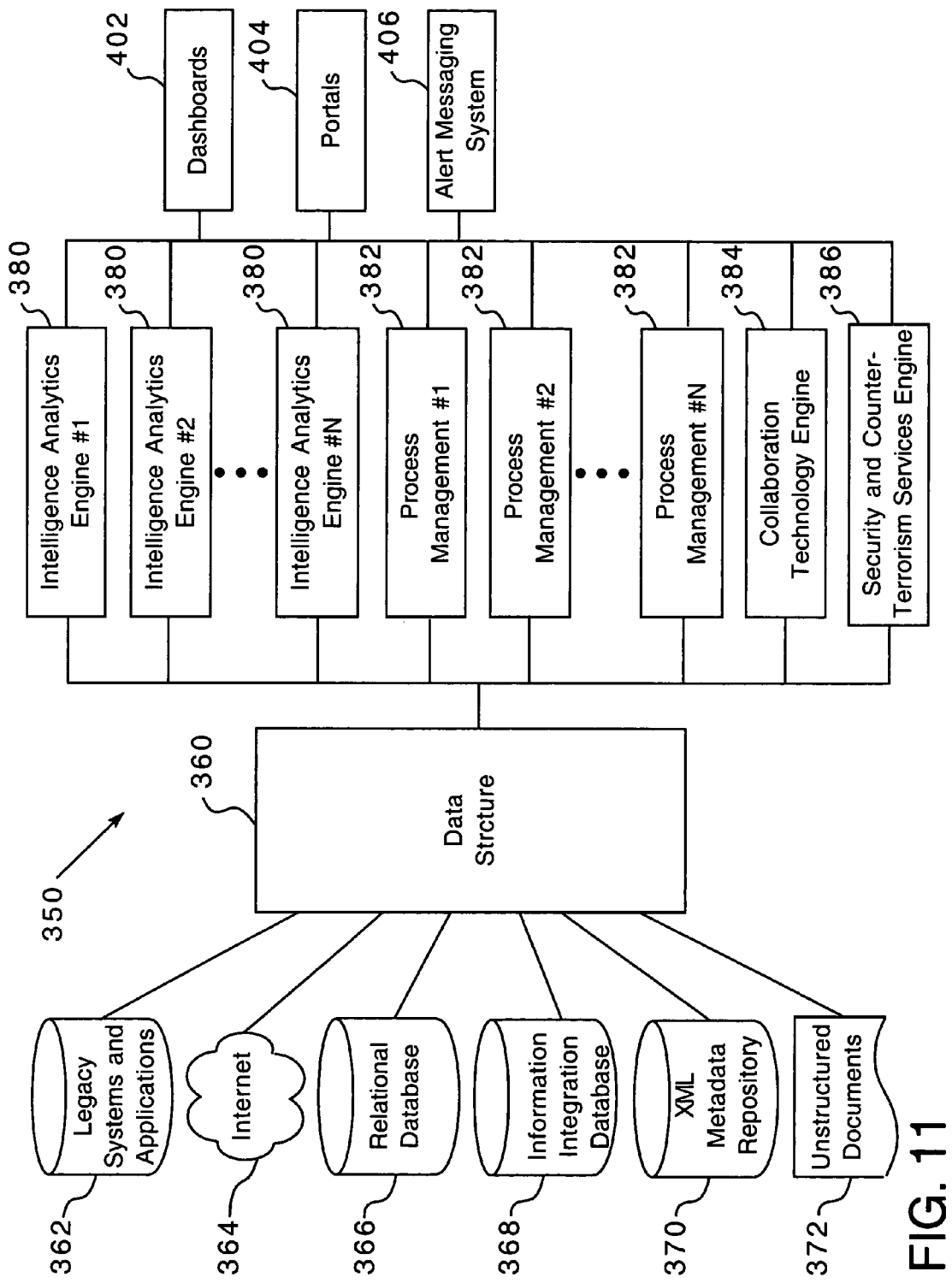
FIG. 11 is a diagram of a system used in the performance of the methods according to various embodiments of the present invention.

FIG. 11 is a diagram of an integrated enterprise information system 350, according to various embodiments, to be employed, for example, in the performance of the above-described methods. For example, the system 350 may provide access to the data needed in the performance of various of the procedures outlined above, as well as provide a mechanism to communicate key information about the enterprise to persons who can use the information in a timely manner.

As illustrated in FIG. 11, the system 350 may include a data structure 360, which may collect information from various data sources. The data structure 360 may be, for example, a zero-latent universal data model. Data from the various data sources may be persisted in the data structure 360 for only as long as needed. The data sources may include, for example, legacy system data and data from other enterprise applications 362, the Internet 364, relational databases 366, information integration databases 368, XML Metadata repositories 370, and unstructured data sources 372, such as, for example, hard-copy documents. Some of these data sources, such as the legacy system data and data from other enterprise applications 362 and the relational databases 366, may be considered "structured data" as the information may be stored in structured databases. Other data sources, such as the unstructured data sources 372, may be considered "unstructured" because they are not stored in structured databases. Unstructured data may be "structurized" for use by the data structure 360, for example, by converting the unstructured data to XML data with associated meta data.

The data structure 360 may retrieve data, including metadata, from the data sources 362-372 as needed in the performance by the system 350, such as for the optimization, compliance and security analyses and implementation routines described above. Metadata is data about data. Some of the retrieved data may be persisted in the data structure 360 and some retrieved data may not be persisted, residing instead in the data structure 360 on only a temporary basis. Data in the data structure 360 and its relationship to other data may be defined according to, for example, a data description language (DDL). In addition, according to various embodiments, all of the data from the data sources may be accessible in XML. The data structure 360 may manifest itself, for example, as a federated database and/or a virtual data aggregation layer.

The system 350 may include a number of engines in communication with the data structure 350. The engines may assist in the compliance, optimization, and/or security processes described above in conjunction with FIGS. 1-10, in an ongoing and continual basis. For example, the system 350 may include a number of intelligence analytics engines 380, a number of process management engines 382, one or more collaboration technology engines 384, and one or more security and counter-terrorism services engines 386. The engines 380, 382, 384, 386 may retrieve data from the data structure 360, which in turn may retrieve data from the data sources as needed. The data retrieved by the data structure 360 need not be persisted in the data structure, but rather may be passed onto the appropriate engine 380, 382, 384, 386 for use by that engine.

The engines 380, 382, 384, 386 may be implemented as software code to be executed by a processor(s) (not shown) of the system 350 using any type of computer instruction type suitable, such as, for example, Java, C, C++, Visual Basic, etc., using, for example, conventional or object-oriented techniques. The software code may be stored as a series of instructions or commands on a computer readable medium, such as a random access memory (RAM), a read only memory (ROM), a magnetic medium such as a hard drive or a floppy disk, or an optical medium such as a CD-ROM.

The system 350 may also include, as illustrated in FIG. 11, a number of output devices 400 for communicating information to persons associated with the enterprise. The output devices 400 may be in communication with the engines 380, 382, 384, 386 and may, for example, display information from the engines 380, 382, 384, 386. The output devices may include, for example, portals 402, dashboards 404, alert messaging systems 406, etc. The output devices 400 may display, for example, real-time or near real-time business activity monitoring (BAM) metrics that are important to the monitoring of the business process optimization, compliance and risk routines described above. The output devices 400 may be, for example, web-based, enterprise information system tools, application-based graphical user interfaces, etc.

The intelligence analytics engines 380 may analyze enterprise data, on an ongoing and continual basis, to determine parameters and business metrics relevant to the enterprise. For example, the intelligence analytics engines 380 may determine, on an ongoing basis, whether certain performance requirements for business processes of the enterprise, such as determined by the optimization strategy 38 (see FIGS. 1 and 9), are being satisfied. For instance, if the enterprise includes a call center, one of the intelligence analytics engines 380 may analyze whether calls are being answered within a predetermined period of time. If not, the intelligence analytics engine 380 may issue a notification or otherwise alert somebody associated with the enterprise via one or more of the output devices 400.

The process management engines 382 may use, for example, Business Process Management (BPM) technology. BPM is a knowledge-based process management technology that executes and monitors repeatable business processes that have been defined by a set of formal procedures. For example, the process management engines 382 may, for example, on an ongoing and continual basis, execute and monitor various business processes of the enterprise that have been defined to satisfy the master plan for the process (see FIG. 1) in terms of compliance, optimization, and/or security. For example, certain of the process management engines 382 may implement procedures to comply with government regulatory compliance requirements as determined by the compliance strategy 36, and/or procedures to optimize the business process, such as determined by the optimization strategy 38, and/or procedures to implement the protection and security plan 34. In addition, output from these procedures may be communicated to the output devices 400 in order that, for example, persons associated at the enterprise, such as executive and managers, may monitor aspects of the performance of these procedures.

In addition, the process management engines 382 may employ business process integration (BPI). BPI is the automated operation of a straight-through business process across multiple applications, typically focused on the exchange and update of information and the elimination of manual intervention (with its attendant cost and inaccuracy). BPI systems are based on real-time interactions via the Internet and are not limited to batch processing cycles, unlike EDI. The process management engines 382 may be programmed in, for example, Business Process Execution Language (BPEL), which defines a notation for specifying business process behavior. Further, one or more of the intelligence analytics engines 380 may use data from the process management engines 382 and one or more of the process management engines 382 may utilize data from the intelligence analytics engines.

The collaboration technology engine 384 may, for example, gather and arrange critical, time sensitive enterprise data for presentation to those users that need to disseminate that data immediately or promptly.

The security and counter-terrorism services engine 386 may, for example, provide link analysis and/or predictive analysis on the data in the data sources to identify potential security or terrorist threats. When a potential security or terrorist threat is identified, that information may be communicated via one or more of the output devices 400.

While several embodiments of the present invention have been described herein, it should be apparent that various modifications, alterations and adaptations to those embodiments may occur to persons skilled in the art. For example, various steps in the process flows of FIGS. 1-10 may be performed in different orders. It is therefore intended to cover all such modifications, alterations and adaptations without departing from the scope and spirit of the present invention as defined by the appended claims.

What is claimed is:

1. A method, comprising:
    identifying at least one critical asset of an enterprise;
    identifying at least one business process of the enterprise associated with the identified critical asset;

evaluating at least one technological component related to the business process;

creating a threat profile for an area of concern associated with the business process and the critical asset;

creating an interdependency matrix for business processes of the enterprise;

performing a risk analysis, a regulatory compliance analysis and a business process optimization analysis for the business process based on the evaluation of the at least one technological component related to the business process, the threat profile for the area of concern associated with the business process and the critical asset, and the interdependency matrix for business processes of the enterprise;

developing a strategy for the enterprise's performance of the business process based on the performance of the risk analysis, the regulatory compliance analysis and the business process optimization analysis for the business process, wherein developing the strategy comprises developing at least one protection strategy, at least one compliance strategy, and at least one business process optimization strategy, and wherein the at least one compliance strategy is developed based on applicable government regulations for the enterprise's performance of the business process;

developing a master plan for the enterprise based on the at least one protection strategy, at least one compliance strategy, and at least one business process optimization strategy; and monitoring the enterprise's performance of the business process, with a computer-based enterprise information system comprising at least one processor and a computer readable medium storing instructions to be executed by the at least one processor, to assess compliance with the strategy, wherein the at least one processor is programmed to retrieve information from one or more data sources to assess compliance with the strategy, wherein the computer-based enterprise information system comprises a plurality of engines executed by the at least one processor, wherein the plurality of engines comprise:

an intelligence analytics engine that analyzes information from the one or more data sources to determine one or more parameters relevant to the enterprise's performance of the business process; and a process management engine that monitors the enterprise's performance of the business process in terms of compliance with the applicable government regulations, business process optimization, and security.

2. The method of claim 1, further comprising executing a mitigation response plan when the enterprise's performance of the business process is not in compliance with the strategy.

3. The method of claim 1, further comprising creating the threat profile for the area of concern, wherein creating the threat profile for the area of concern comprises identifying at least one area of concern for the enterprise related to the business process, wherein identifying the at least one area of concern comprises at least one of:

determining a state of regulatory compliance by the enterprise for the business process;

determining a state of data security practices by the enterprise for the business process;

identifying potential threats to the enterprise with respect to the business process; and identifying business process security requirements for the business process.

4. The method of claim 3, wherein creating the threat profile further comprises:

determining potential outcomes for at least one of a security threat and a compliance threat to the business process; and determining performance risks for the business process related to the enterprise's performance of the business process.

5. The method of claim 1, further comprising generating the interdependency matrix for business processes of the enterprise.

6. The method of claim 1, wherein evaluating the at least one technological component of the enterprise associated with the enterprise's performance of the business process comprises:

identifying technological components used by the enterprise in the performance of the business process;

performing an optimization analysis on the technological components; and selecting the at least one technological component for evaluation based on the optimization analysis.

7. The method of claim 6, wherein evaluating the at least one technological component of the enterprise associated with the enterprise's performance of the business process further comprises:

identifying at least one evaluation tool to be used for evaluating the at least one technological component;

running the at least one evaluation tool;

analyzing results from running of the evaluation tool; and creating a vulnerability summary based on the results.

8. The method of claim 1, wherein performing the risk analysis comprises:

evaluating a risk of each threat outcome from the evaluation of the at least one technological profile and the threat profile on at least one impact category; and assigning a risk impact to each threat based on the evaluation.

9. The method of claim 1, wherein developing the at least one protection strategy comprises:

evaluating results of the risk analysis, regulatory compliance analysis, and process optimization analysis in strategic practice areas of the enterprise;

creating a strategic protection strategy for the enterprise based on the evaluation of the risk analysis, regulatory compliance analysis, and process optimization analysis in the strategic practice areas of the enterprise;

evaluating results of the risk analysis, regulatory compliance analysis, and process optimization analysis in operational practice areas of the enterprise; and creating an operational protection strategy for the enterprise based on the evaluation of the risk analysis, regulatory compliance analysis, and process optimization analysis in the operational practice areas of the enterprise.

10. The method of claim 9, wherein developing the at least one protection strategy further comprises creating a risk mitigation plan based on the strategic protection strategy and the operational protection strategy.

11. The method of claim 1, wherein developing the at least one compliance strategy comprises:

evaluating results of the risk analysis, regulatory compliance analysis, and process optimization analysis in strategic practice areas of the enterprise;

creating a strategic compliance strategy for the enterprise based on the evaluation of the risk analysis, regulatory compliance analysis, and process optimization analysis in the strategic practice areas of the enterprise;

evaluating results of the risk analysis, regulatory compliance analysis, and process optimization analysis in operational practice areas of the enterprise; and creating an operational compliance strategy for the enterprise based on the evaluation of the risk analysis, regulatory compliance analysis, and process optimization analysis in the operational practice areas of the enterprise.

12. The method of claim 11, wherein developing the at least one compliance strategy further comprises creating a risk mitigation plan based on the strategic compliance strategy and the operational compliance strategy.

13. The method of claim 1, wherein developing the at least one optimization strategy comprises:

evaluating results of the risk analysis, regulatory compliance analysis, and process optimization analysis in strategic practice areas of the enterprise;

creating a strategic optimization strategy for the enterprise based on the evaluation of the risk analysis, regulatory compliance analysis, and process optimization analysis in the strategic practice areas of the enterprise;

evaluating results of the risk analysis, regulatory compliance analysis, and process optimization analysis in operational practice areas of the enterprise; and creating an operational optimization strategy for the enterprise based on the evaluation of the risk analysis, regulatory compliance analysis, and process optimization analysis in the operational practice areas of the enterprise.

14. The method of claim 13, wherein developing the at least one optimization strategy further comprises creating a risk mitigation plan based on the strategic optimization strategy and the operational optimization strategy.

15. The method of claim 1, wherein the data sources comprise zero-latent data sources.

16. The method of claim 15, wherein the one or more data sources includes at least one structured data source and at least one unstructured data source.

17. The method of claim 1, further comprising performing link analysis to identify at a security threat for the enterprise.

18. The method of claim 1, further comprising sending a signal to an output device when the enterprise's performance of the business process is not in compliance with the strategy.

* * * * *